United States Patent
Huang

(10) Patent No.: US 9,301,092 B2
(45) Date of Patent: Mar. 29, 2016

(54) EARTH POSITIONING SYSTEM

(71) Applicant: Jung-Tang Huang, Taipei (TW)

(72) Inventor: Jung-Tang Huang, Taipei (TW)

(73) Assignee: INTERNATIONAL MOBILE IOT CORP., Taipei (TW)

( * ) Notice: Subject to any disclaimer, the term of this patent is extended or adjusted under 35 U.S.C. 154(b) by 22 days.

(21) Appl. No.: 14/038,775

(22) Filed: Sep. 27, 2013

(65) Prior Publication Data

US 2014/0094136 A1 Apr. 3, 2014

(30) Foreign Application Priority Data

Oct. 1, 2012 (TW) .............................. 101136205 A

(51) Int. Cl.
*H04W 4/02* (2009.01)
*G01S 1/04* (2006.01)
*G01S 1/68* (2006.01)

(52) U.S. Cl.
CPC .. *H04W 4/02* (2013.01); *G01S 1/04* (2013.01); *G01S 1/68* (2013.01)

(58) Field of Classification Search
USPC ........................... 455/404.2, 456.3; 340/572.1
See application file for complete search history.

(56) References Cited

U.S. PATENT DOCUMENTS

| | | | | |
|---|---|---|---|---|
| 7,675,410 | B2* | 3/2010 | Aritsuka et al. | 340/539.1 |
| 8,055,296 | B1* | 11/2011 | Persson et al. | 455/556.1 |
| 2005/0130677 | A1* | 6/2005 | Meunier et al. | 455/456.6 |
| 2007/0013516 | A1* | 1/2007 | Freitag et al. | 340/572.1 |
| 2008/0242314 | A1* | 10/2008 | McFarland | 455/456.1 |
| 2009/0325607 | A1* | 12/2009 | Conway et al. | 455/456.3 |
| 2010/0190455 | A1* | 7/2010 | Hashizume | 455/90.3 |
| 2010/0290504 | A1* | 11/2010 | Torimoto et al. | 375/130 |

* cited by examiner

*Primary Examiner* — William Nealon
(74) *Attorney, Agent, or Firm* — Jianq Chyun IP Office

(57) ABSTRACT

An earth positioning system (EPS) is provided. The EPS includes a plurality of fixed LED lights with communication functions and a mobile communications device. A cloud computer and at least one map marked with world coordinates of the fixed LED lights may be further included. The LED light includes a substrate, at least one LED die, a power supply, a wireless communication module, a control unit and a housing. The LED lights may be arranged in indoor and outdoor environments, with coordinates represented in longitude, latitude and altitude. The coordinates are included in a map data of the cloud computer. When the mobile communication device moves with its carrier, the world coordinates of the mobile communication device can be located based on the coordinates of the LED lights nearby or based on the unique IDs of the LED lights together with the aforementioned map.

28 Claims, 11 Drawing Sheets

EARTH POSITIONING SYSTEM

CROSS-REFERENCE TO RELATED APPLICATION

This application claims the priority benefit of Taiwan application serial no. 101136205, filed on Oct. 1, 2012. The entirety of the above-mentioned patent application is hereby incorporated by reference herein and made a part of this specification.

BACKGROUND OF THE INVENTION

1. Field of the Invention

The invention relates to an earth positioning system, and more particularly, to a smart networking system having positioning functions, which is composed of a plurality of fixed light-emitting diode (LED) lights with communication functions and a mobile communication device, in which a cloud computer, and at least one world map marked with coordinates of longitude, latitude and altitude of the fixed LED light can be further included.

2. Description of Related Art

It is well known that a global positioning system (GPS) has a positioning accuracy of substantially 10 to 20 meters in an outdoor environment without any shelter when using an ordinary mobile communication device. It needs equipment with higher costs in case a more accurate positioning is required. Currently, the ordinary mobile communication device and GPS simply cannot accomplish requirements for the positioning accuracy with errors toleration within two meters, thus there is still room for improvements.

Further, the global positioning system (GPS) is basically useless in indoor or outdoor environments with shelters. With more than a half of the world population who lives in a city with a lot of buildings, most of activities of the people in the city happen in the building. Therefore, it is important to perform accurate positioning such as positioning persons or pets in indoor or outdoor shelters, or outdoor transportation vehicles with shelters such as a taxi, a bus, a private car, an article, or even a boat on river. Furthermore, an accurate positioning can provide various functions such as location-based services, aids, and data mining.

SUMMARY OF THE INVENTION

The invention provides an earth positioning system based on an indoor/outdoor light source. Said light source is a LED light with built-in communication function of BLUETOOTH 4.0 and above. An indoor/outdoor user (including a person or a vehicle) carries a mobile communication device having at least the communication function of BLUETOOTH 4.0 and above, and a WIFI communication function, such as a wearable communication device or a mobile phone. Accordingly, this allows each user who carries the mobile communication device to perform the accurate indoor or outdoor positioning with the positioning accuracy at least ranged between 1 to 2 meters. A location of the user and an environment around the user can be obtained, analyzed and processed in order to monitor personal security, or provide location-based public services from government agencies to people, or provide location-based business services from commercial agencies to consumers, or provide location-based medical attentions from medical agencies to patients.

The invention provides an earth positioning system based on an indoor/outdoor light source. Said light source is a LED light with built-in communication function of BLUETOOTH 4.0 and above. An indoor/outdoor user or a car carry a mobile communication device having a communication function of BLUETOOTH 4.0 and above, and a WIFI communication function, such as a wearable communication device of, for example, an earphone-type device, a bracelet-type device, a glasses-type device, a mobile phone or a tablet computer. Accordingly, this allows the indoor/outdoor light source to determine whether to be turned on, or whether to adjust its illumination according to the positioning of the mobile communication device nearby, so as to achieve energy saving and carbon dioxide reduction.

The invention provides an earth positioning system based on an indoor/outdoor light source. Said light source is a LED light with built-in communication function of BLUETOOTH 4.0 and above. A user carries a mobile communication device having a communication function of BLUETOOTH 4.0 and above, and a WIFI communication function, such as a wearable communication device of, for example, an earphone-type device, a bracelet-type device, a glasses-type device, a mobile phone or a tablet computer. A smart networking system having at least a wearable sensor on the user based on earth positioning and data of at least an environment sensor is composed of the mobile communication device reading and collecting data from the wearable sensor on the user through a BLUETOOTH communication and data of the environment sensor installed on the LED light, along with the positioning data.

DESCRIPTION OF THE EMBODIMENTS

Figure 1:
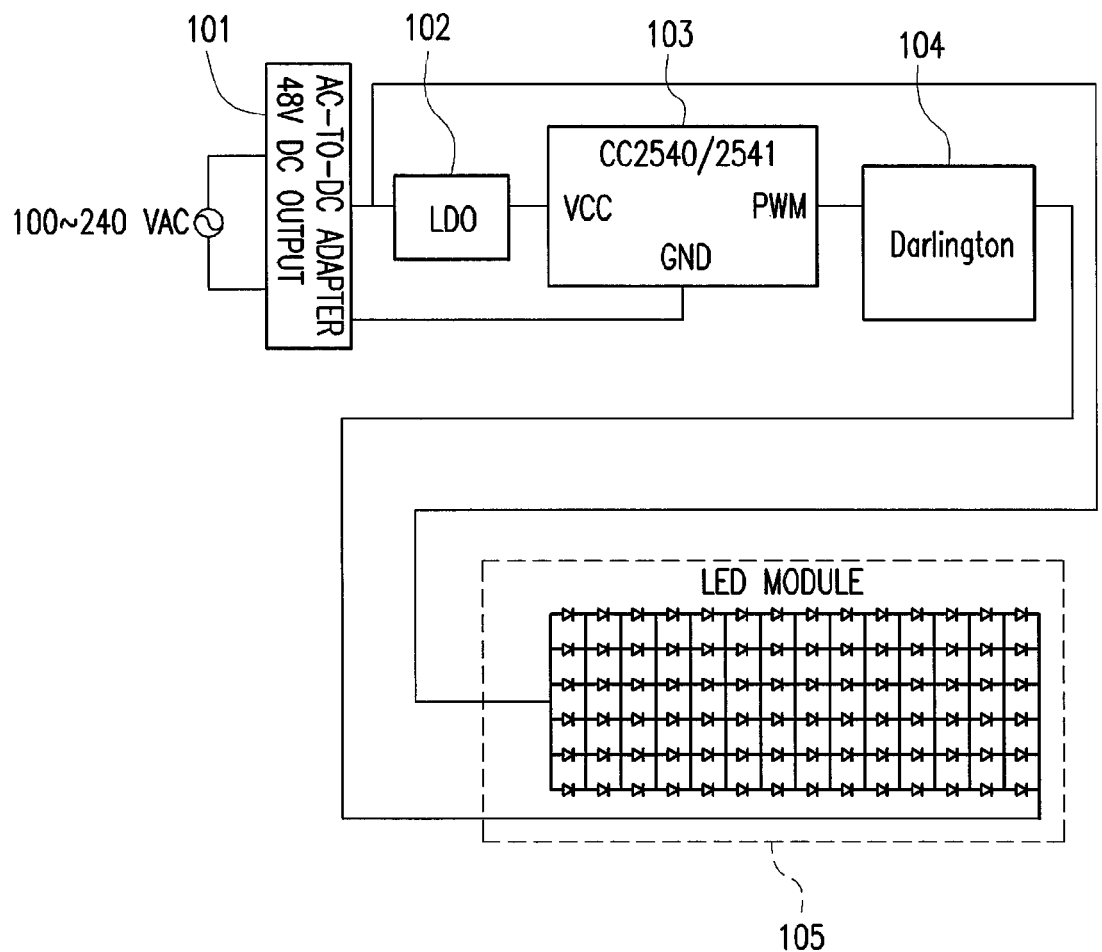
FIG. 1 is a circuit schematic diagram of a BLUETOOTH low energy module embedded in a LED street light according to the invention.

An outdoor light source refers to an outdoor light such as a street light, a floor light, or a wall light. The outdoor light can light up outdoor regions such as roads, parks, car parks, footways, parkways, highways or other public regions. Each of the aforementioned lights may be with or without a solar cell. The outdoor light source provides lighting to the road or the parkways at night, and often accounts for a large electricity costs in the city. Despite that governments are obliged to provide environments for safe activities at night, in consideration of requirements for energy saving and carbon dioxide reduction, the outdoor light source still needs a smart control in order to achieve both purposes of power saving and safety lighting. In conventional art, approaches such as controlling LED street light with GPS positioning, or installing a ZIGBEE wireless sensor (WSN) module together with a person carrying a mobile device with GPS, which are served as a basis of controlling the illumination of the street light. Disadvantages of said approaches are that, the positioning accuracy of the GPS of the mobile device is merely 10 to 20 meters, whereas ZIGBEE is easily influenced by shelters of leaves and trees. Accordingly, controlling of the illumination of the street light is ineffective, that is, the street light is often lighted when it should not be, and vice versa. Therefore, it requires a method which is more reliable when it comes to control the illumination of the street light.

Generally, a distance between two adjacent street lights is 30 meters. In case the width of a road is 12 meters, it only requires one row of street lights. In case the width of the road is greater than 24 meters, it requires two rows of streets lights. Generally, the height of the street light can be approximately 4 meters, 6 meters, 8 meters or 10 meters. As the height gets lower, the lighting range thereof gets smaller, and the wattage required is thereby smaller, so that the street lights need to be arranged more closely. On the contrary, as the height gets higher, the lighting range thereof gets larger, and the wattage required is thereby larger so that the street lights do not need to be arranged more closely. Generally, in the existing technologies, a 96-watt street light has a height of 8 meters, and the distance between two adjacent street lights is 32 meters. In case the average time from sunset to sunrise is 11 hours, it requires 1.056 KW-H which is equivalent to 1 kilowatt a day and approximately 365 kilowatts a year.

The time for lighting up the street lights may be different based on different seasons and different locations. Basically, the light is embedded with a BLUETOOTH communication module including a microprocessor, and a possible embodiment to that can be implemented by using commercial chips such as TI CC2540/2541, CSR-1000, CSR-1001, ANT or ANT+. A location-based sunset and sunrise time can be programmed into said microprocessor. Further, updated new control parameters can be written directly and wirelessly by the mobile communication device into the BLUETOOTH communication module. Accordingly, the time for lighting up the street lights can be modulated smartly while considering issues of safety lighting, energy saving and carbon dioxide reduction.

The street light is mainly configured to provide lighting for persons or cars passing through the lighting range of the street light at night. Therefore, in addition to controlling the time for lighting up the street lights based on the sunset time and sunrise time of the seasons, the time for lighting up the street lights can also be controlled through BLUETOOTH and WIFI modules of the mobile device. Especially, the illumination intensity of the street light can be controlled according to a received signal-strength indicator (RSSI) or a distance between the BLUETOOTH module of the mobile device and the BLUETOOTH module inside the street light. In a preferable embodiment, the illumination intensity covers a range of 50 meters. In this case, clear vision within the range of 50 meters around pedestrians at night can then be ensured. Moreover, a low illumination may be adopted when nobody is around within the range of 50 meters, wherein the low illumination has to be maintained at a level to prevent the possibility of lurking bad guys and to save energy and reduce carbon dioxide production. Once there is someone around within the range of 50 meters, a high illumination is then adopted.

By lowering illumination when persons and cars are relatively less at night, not only can the power be saved, depreciation rates of the LED module and other circuit modules of the street light can also be lowered to extend its operating life.

As shown in FIG. 1, in the street light of the invention, a circuit block is further added to a 48V DC output line of an AC-DC converter 101. The circuit block mainly includes a low dropout (LDO) regulator module 102, a BLUETOOTH 4.0 module 103, a Darlington pair 104 and a LED module 105. The LDO regulator module 102 converts the 48V DC voltage output by the AC-DC converter 101 to 3V. The 3V DC voltage is provided as the power source of the BLUETOOTH module 103. The Darlington pair 104 is configured to amplify the pulse width modulation (PWM) signal provided by the BLUETOOTH module 103. An embodiment of the BLUETOOTH 4.0 module 103 can be implemented by using commercial chips such as a TI CC2540/2541, CSR-1000, CSR-1001, ANT or ANT+. The BLUETOOTH 4.0 module 103 includes a built-in microprocessor 8051 into which programs may be written to perform various dimming controls. For instance, a turn-on time can be provided to the Darlington pair 104 and then to the LED module 105 through a PWM control, so as to provide the illumination for lighting. In addition, reference to converting a lamp into a LED light with built-in communication function of BLUETOOTH 4.0 and above can refer to Taiwan patent application No. 100127360 applied by the applicant, and titled "LIGHT-SOURCE-BASE INTERNET OF THING". Said application proposes a circuit module with the communication function of BLUETOOTH 4.0 and above built in a standard LED bulb or LED tube, which allows the user to directly change an existing lamp or tube into an LED light with the communication functions.

A LED light depicted in FIG. 1 has an embedded wireless communication module (such as the TI CC2540/2541), which is a system chip having both a BLUETOOTH low energy communication function and a microprocessor. When the chip operates in a slave node mode, data being broadcasted may be as long as 128 bytes. A possible embodiment of the data may include a combination of, for example, a 26-byte longitude coordinate, a 26-byte latitude coordinate, a 9-byte altitude coordinate, 30-byte data from an environment sensor and a 6-byte time data. It should be noted that, the coordinates of longitude, latitude and altitude are configured to mark a location or a place where the LED light is located, which are unique world coordinates conforming to the exchangeable image file format (EXIF) standard, as shown in Table 1. Accordingly, the aforementioned coordinates can be easily converted, or embedded in a photo, a video or an audio file. With the location or the place of the LED light provided, the BLUETOOTH module of the mobile communication device can quickly scan and obtain a 3-D coordinates of the LED light nearby, thereby calculating a 3-D coordinates of the mobile communication device itself.

TABLE 1

| Tag ID | Tag Name | Writable | Values/Notes |
|---|---|---|---|
| 0x0001 | EPSLatitudeRef | string[2] | 'N' = North<br>'S' = South |
| 0x0002 | EPSLatitude | rational64u[3] | |
| 0x0003 | EPSLongitudeRef | string[2] | 'E' = East<br>'W' = West |
| 0x0004 | EPSLongitude | rational64u[3] | |
| 0x0005 | EPSAltitudeRef | int8u | 0 = Above sea level |

TABLE 1-continued

| Tag ID | Tag Name | Writable | Values/Notes |
|---|---|---|---|
| 0x0006 | EPSAltitude | rational64u | 1 = Under sea level |

Figure 2:
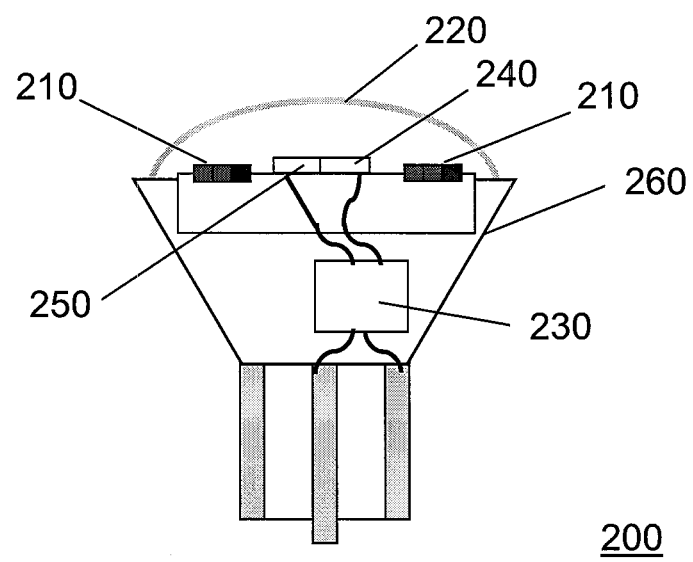
FIG. 2 is a schematic diagram illustrating an LED light according to an embodiment of the invention.

FIG. 2 is a schematic diagram illustrating an LED light 200 according to another embodiment of the invention. The LED light 200 may be an outdoor light or an indoor light. The LED light 200 includes a substrate 260, one or more LED dies 210 fixed on the substrate 260, a control unit 250, a wireless communication module 240, a power supply 230, and a housing 220. The control unit 250 is fixed on the substrate 260 and is electrically connected to the LED dies 210. The control unit 250 stores a unique identification code of the LED light 200. The wireless communication module 240 is fixed on the substrate 260 and is electrically connected to the control unit 250. The wireless communication module 240 is configured to wirelessly transmit the coordinates of longitude, latitude and altitude of the LED light 200. The power supply 230 is fixed on the substrate 260 and is configured to supply power to the LED dies 210, the control unit 250 and the wireless communication module 240.

In other words, the positioning function as addressed in the invention is mainly done by changing the existing lamp (bulb or tube) into an LED light with the communication functions, and the LED light includes a built-in wireless communication module with BLUETOOTH 4.0 and above. A mobile communication device is also provided, which at least includes a communication function of BLUETOOTH 4.0 and above, and a WIFI communication function. The user can use the mobile communication device to scan the coordinates of longitude, latitude and altitude or a wireless communication identification (ID) and a received signal-strength indicator (RSSI) value of the LED light. The wireless communication identification is a unique ID code of the built-in wireless communication module of the LED light. The wireless communication identification is based on a local wireless communication protocol/function supported by the built-in wireless communication module, such as BLUETOOTH or WIFI. The mobile communication device can directly perform calculations based on those data. Those data are sent to a gateway nearby or a cloud to the related caregivers or monitoring personnel. Said positioning information and knowledge are obtained according to a trilateration technology including a triangulation together with power transmitting control to effectively increase the positioning accuracy, and an executing order thereof is provided below.

Step 1: A BLUETOOTH master node of the mobile communication device reads a salve node within an assessable range of BLUETOOTH 4.0 by utilizing a scanning function. In this case, the transceiving power of the BLUETOOTH master node is at the maximum level, such that the time required for scanning is as short as 1/20 seconds.

Step 2: A possible location of the BLUETOOTH master node within the assessable range is mainly ensured by performing the triangulation utilizing at least one triple light source combination, and the triple light source combination can increase the positioning accuracy.

Since lamps mount on the ceiling or the street light have advantages in higher place, together with the mobile communication device, a line of sight (LOS) channel between the slave node and the master node can be effectively executed without having serious conditions caused by multi-path transmission, such that the positioning accuracy can be substantially increased. This can be properly adjusted according to amount of moving persons or moving objects, and a model can also be built based on methods such as fuzzy inference or neural inference. Different from RSSI, the PHY (physical) layer power feature, channel response, is also able to discriminate multipath characteristics, thus holds the potential for the convergence of accurate and pervasive indoor localization. Therefore Channel State Information (CSI, reflecting channel response in WiFi or Zigbee or BLUETOOTH) is one alternative way to integrate with the trilateration technology in this invention to reach sub-meter level accuracy. Besides, in the related art, fingerprinting is one of the mainstreams other than the trilateration technology to convert physical measurements into locations. The invention can employ fingerprinting by collecting signal features of all possible locations provided by the BLUETOOTH nodes in the area of interests to build a fingerprint database (known as site-survey or calibration). Localization is then simply the process of matching the measured fingerprints at an unknown location with those in the database and returning the location corresponding to the best-fitted fingerprint. Since the subsequent processes are well-known to persons having ordinary skilled in the art, detailed descriptions are omitted herein.

With the positioning function as described above, various dimming controls and color changing for the LED light can be performed automatically by a communication module such as Texas Instruments CC2540/2541 according the distance between the mobile communication device and the LED light. For instance, the dimming controls for the street light can be done by the mobile communication device directly writing the RSSI value or the distance to the CC2540/2541 module embedded in the LED light. Generally, the moving speed of a person is 5000 meters/3600 seconds=1.5 m/sec, and the distance between two adjacent street lights is 30 meters. Accordingly, the LED street can be set to determine the illumination of the dimming controls by receiving the distance and the RSSI value from the mobile phone according to a preset time (e.g., one second), which is still quick and effective. It should be noted that, a preferable minimum illumination is still of 50% illumination or lower, and a method for adjusting the illumination may be done by making the illumination brightening or darkening.

Besides the automatic dimming controls and color changing, the street light and the indoor light of the invention can also serve as a landmark of the earth positioning system. A solution for including both roles is provided below.

1. Set the light source as the slave node to be scanned. In case multiple mobile communication devices appear at the same time, each of the mobile communication devices can scan and obtain coordinates, or the wireless communication identification and the RSSI value of the light source as the slave node. Therefore, those data can be uploaded to a cloud computer so as to obtain a positioning result. The method for performing the dimming controls is done by the mobile communication device writing the RSSI value to the street light. The light source performs the dimming controls by collecting the RSSI values from the mobile communication devices nearby within a period of time (e.g., two seconds). The dimming controls are immediately performed according to the RSSI value with the highest signal strength. Basically, as the RSSI value gets higher, the illumination gets larger. The dimming controls of darkening should be performed (e.g., darkening to 50% illumination) in case no RSSI value is received in a longer period of time (e.g., at least 5 seconds), which indicates that nobody is around within that time.

2. The BLUETOOTH low energy module of the light source changes between the master node and the slave node in different times. When operating in the master node, the BLUETOOTH low energy module is utilized to read the RSSI value of the closest one of the mobile communication devices nearby to be served as a basis of the dimming controls. When operating in the slave node, the coordinates of the light source or the wireless communication identification and the RSSI value are scanned and obtained by the mobile communication devices nearby. Accordingly, the positioning result can be obtained by calculating directly based on the coordinates of the light source or the wireless communication identification and the RSSI value or uploading those data (the coordinates of the light source or the wireless communication identification and the RSSI value) to the cloud.

3. Each of the nodes is designed as being composed of two single mode modules such as CC2540 or CC2541, in which one is set to the slave node and the other is set to the master node. Alternatively each of the nodes can also be composed of just one dual mode module such as CC 2564, which supports BLUETOOTH+BLUETOOTH Low Energy or ANT. The master node is configured to read the RSSI values from the mobile communication devices nearby and use the closest one of the RSSI values as the basis of the dimming controls. For the slave node, the coordinates of the light source or the wireless communication identification and the RSSI value are scanned and obtained by the mobile communication devices nearby. Accordingly, the positioning result can be obtained by calculating directly based on the coordinates of the light source or the wireless communication identification and the RSSI value, or uploading those data to the cloud.

4. All the street lights are slave nodes for wireless communication which broadcast media access control addresses (MAC addresses) and the coordinates of longitude, latitude and altitude. Car and person both carry mobile phones to scan and obtain at least one of the coordinates and a MAC address of the slave node of the street light, so that the coordinates and the MAC address can be transmitted to the cloud for calculation. In case that the mobile phone can directly scan and obtain the coordinates and the RSSI value from the slave node of the street light, the location of the mobile phone can be directly calculated by the mobile phone through triangulation without the calculation of the cloud, which is relatively quicker. In other words, the mobile phone can directly achieve accurate positioning with an application (APP) installed in the mobile phone without paying any communication fee for Internet. In case it is monitored by the cloud, the positioning data can be sent to the cloud through WIFI, or through 2G/3G/4G. Otherwise, the positioning data can be obtained by the mobile phone itself, which has an advantage in privacy issues. Furthermore, with off-line version of GOOGLE-MAP, the location of the mobile phone can be instantly displayed on GOOGLE-MAP.

For an outdoor positioning system, since the global positioning system (GPS) is already present, a complementation of two systems including the earth positioning system (EPS) of the invention and the GPS can be provided. In case there is none of the light sources serving as the landmark, for example, within the range of 50 meters, the positioning is mainly done by using the GPS. In case there are at least three of the light sources serving as the landmarks within 50 meters, the positioning is done by using the triangulation of the EPS, so to obtain the world coordinates. For the indoor environment, the positioning is mainly done by an indoor light source of the EPS.

Figure 3:
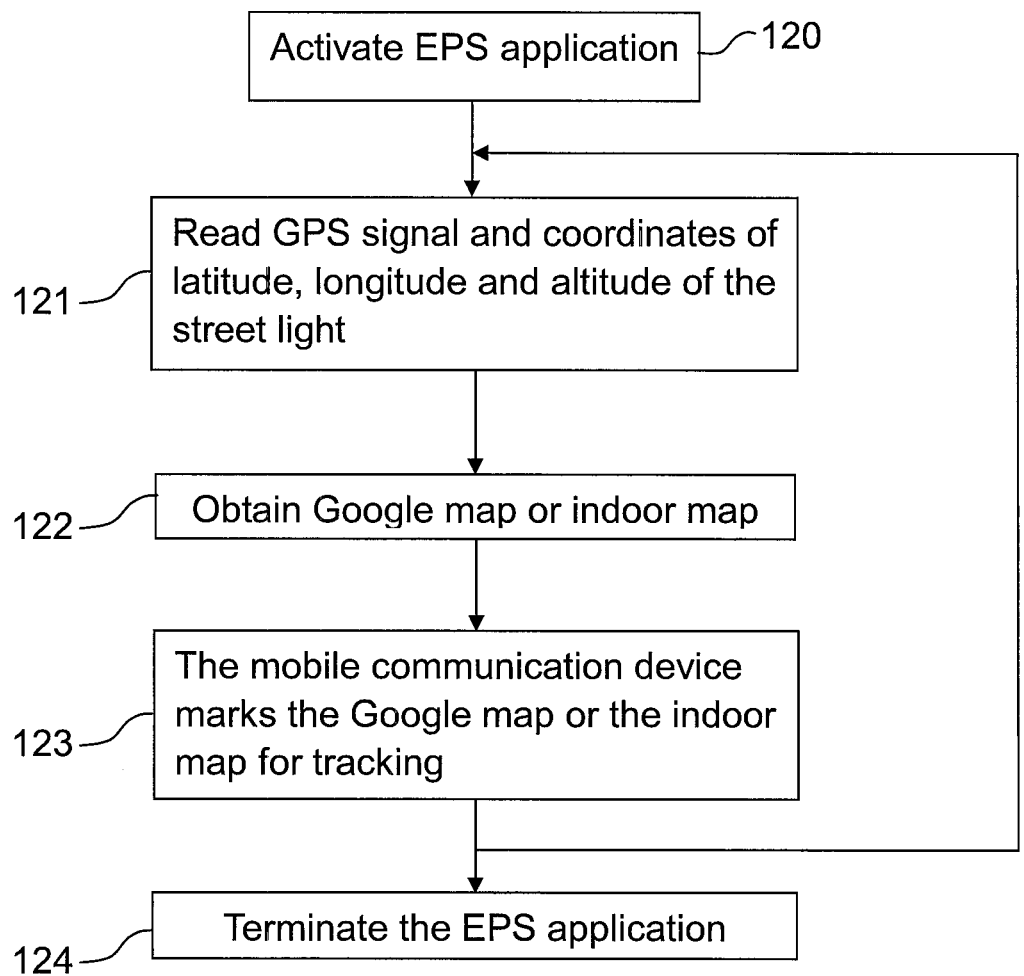
FIG. 3 is a flowchart illustrating operations of the earth positioning system according to the invention.

The following factors need to be considered when converting the system between indoor and outdoor modes. Process for achieving a seamless conversion of the map system is as shown in FIG. 3, in which an EPS application (APP) of the mobile communication device is activated (step 120).

The mobile communication device is utilized to read the GPS signal and scan coordinates of longitude, latitude and altitude of the street light (step 121). In case the GPS signal is not available, the process is based on the coordinates of longitude, latitude and altitude of the BLUETOOTH light source. However, other BLUETOOTH signals from electronic devices other than the light sources can also be scanned, which need to be filtered out. The method for the filtering is to have the BLUETOOTH light source broadcast its coordinates of longitude, latitude and altitude. By doing so, the non-light source with the BLUETOOTH signal but without the coordinates of longitude, latitude and altitude can then be filtered out. In case the GPS signal is available and the coordinates of longitude, latitude and altitude of the street light are not scanned, the process is based on the GPS. In case the GPS signal and the coordinates of longitude, latitude and altitude are both available, the process is still based on the coordinates of longitude, latitude and altitude of the BLUETOOTH light source.

A Google map or indoor map is obtained based on the latest updated coordinates or the latest GPS signal by using a search engine, such as Google (step 122). The map includes the identification code of the BLUETOOTH light source or the coordinates of longitude, latitude and altitude of said light source, which are obtained previously.

An indoor tracking is performed in the indoor map, while an outdoor tracking is performed in the Google map (step 123). Once the identification code of the BLUETOOTH light source or the coordinates of longitude, latitude and altitude of the light source cannot be found in the map, go back to step 121 and step 122. If the EPS application (APP) is no longer in use, proceed to terminate the EPS application (step 124).

Figure 4:
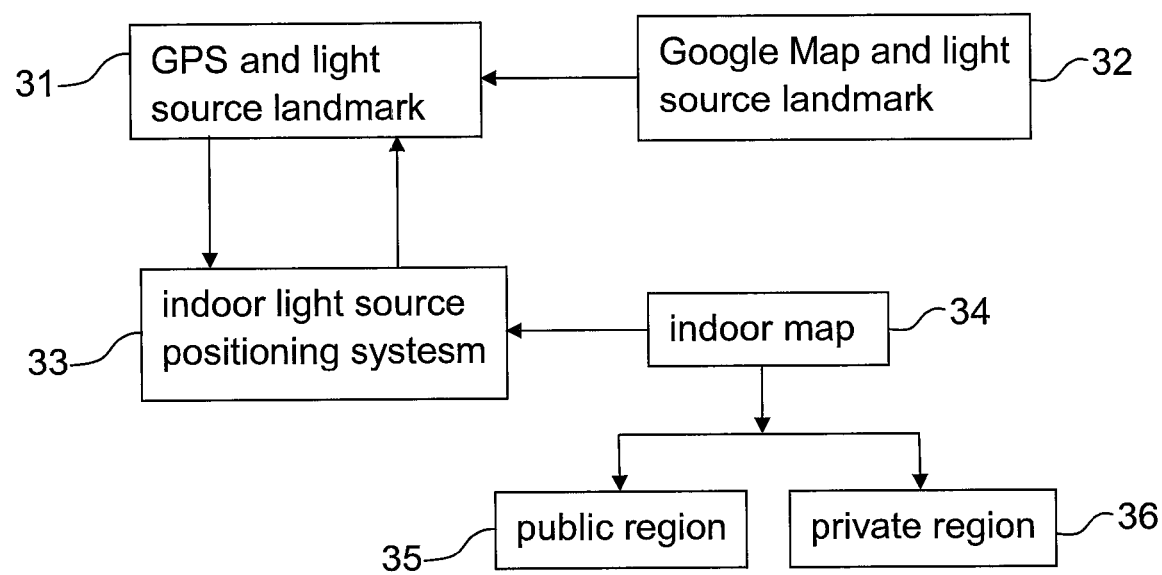
FIG. 4 is a schematic diagram illustrating a switching relation between the maps in the earth positioning system according to the invention.

As shown in FIG. 4, almost the entire outdoor positioning system belongs to public regions, thus the map system is mainly composed of the GPS and the street lights 31 serving as open landmark. On the other hand, the indoor light source positioning system 33 is based on a database storing an indoor map 34. The indoor map 34 includes a public region 35 and a private region 36. The public region 35 of the indoor map 34 includes government agencies, hospitals, department stores, playgrounds, various commercial places and so on. The private region 36 of the indoor map 34 includes private houses. An application (APP) EPS-home generating a map of individual families is stored in a personal cloud computer. An application (APP) EPS-outdoor can be used for public inquiry but cannot change the database arbitrarily. For security and privacy concerns, the public region 35 can provide conditions of the light sources on Google map or Apple map. The private region 36 is associated with another map system. For example, this map system may utilize Google map or Apple map as a background and mark the street light landmarks on the background map. In other words, it is a personal cloud database providing marked data and the marked data are private and personal. If the marked data is to become public data, a certification is required. Process for completing the certification can refer to the volunteer management system of WIKI, in which the data is updated only when certifications provided by ten different users are received.

Figure 5A:
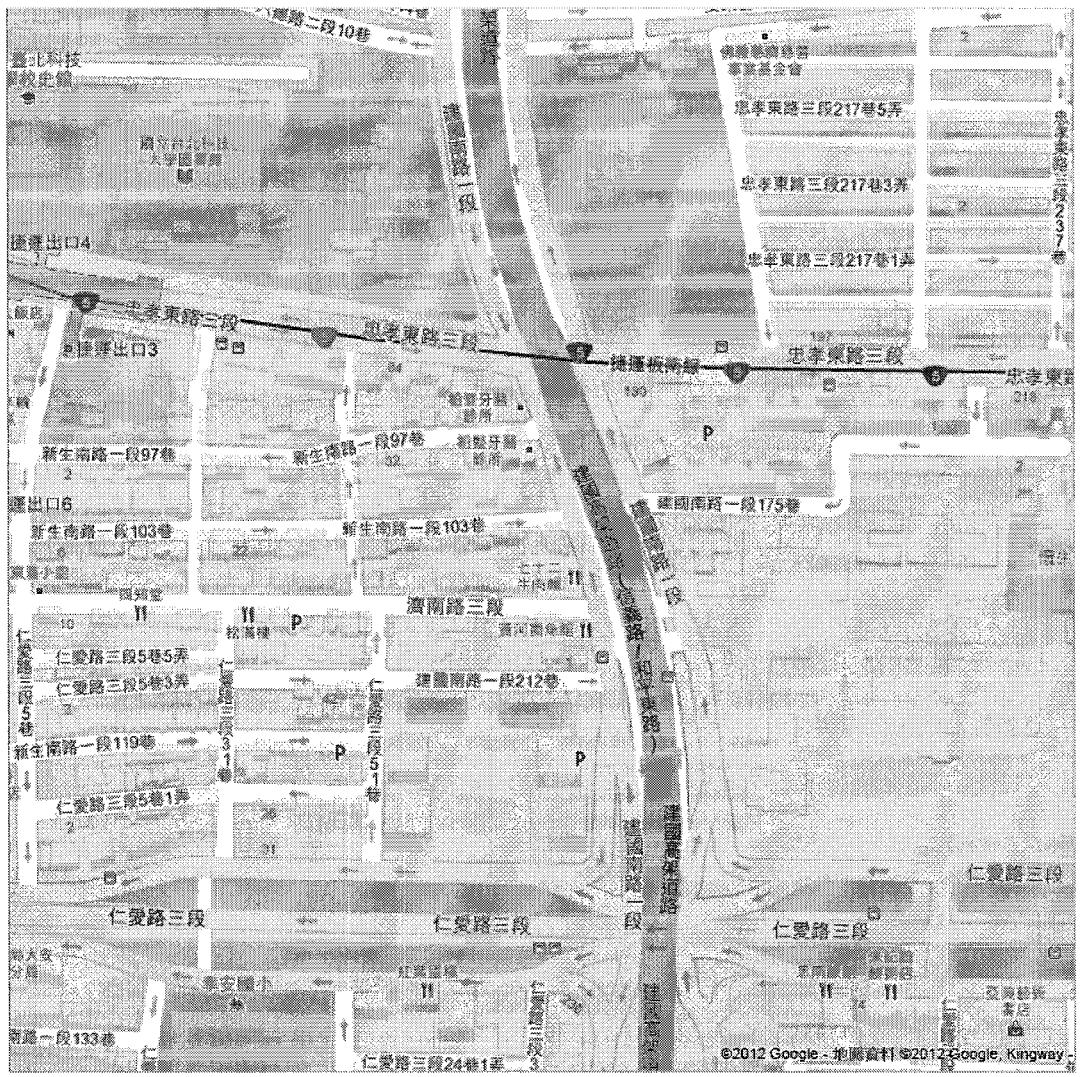
FIG. 5A is a Google map used in the invention.
Figure 5B:
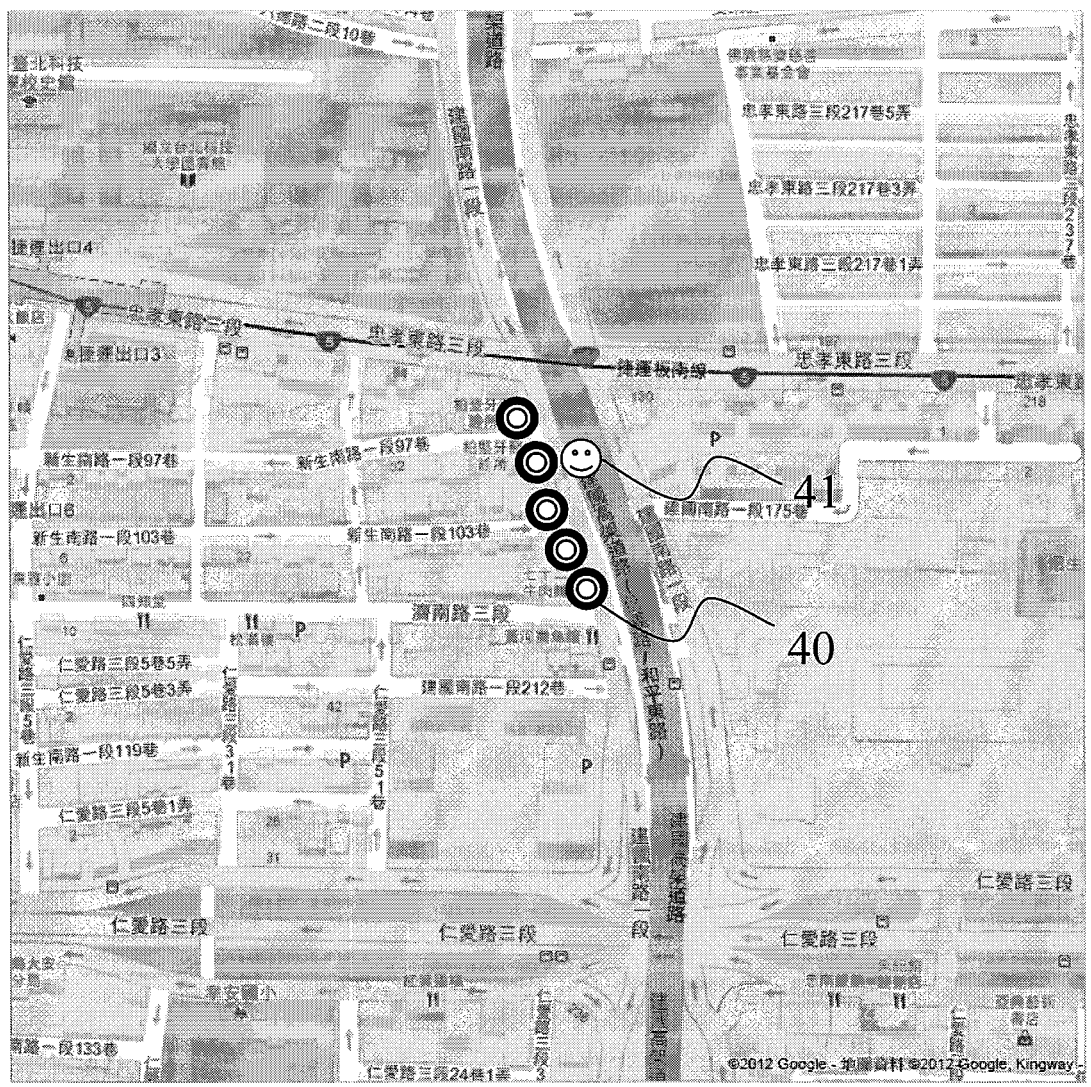
FIG. 5B is said Google map marked with the LED street light and the user according to the invention.

Google Maps is a Google service providing a powerful and friendly map mapping technology, and local commercial information including commercial places, contact information, and driving navigations. Google Maps Javascript is a free service which allows consumers to embed Google Maps into their web pages. FIG. 5A is a content of Google map, and FIG. 5B is the Google map marked with "the street light landmarks" 40 and "the location of the user" 41. The user can set this real-time information as open to those who are permitted for viewing the real-time information, and the information can also become a historical record for inquiry in the future.

The earth positioning systems of the invention use outdoor lights and/or indoor lights as positioning landmarks. Alternatively, electric household appliances that are fixed in houses, such as refrigerators, televisions, washing machines, dishwashers, printers, microwave ovens and baking ovens, may incorporate built-in BLUETOOTH/WIFI communication modules and serve as positioning landmarks in the earth positioning systems as well. Furthermore, any electronic devices incorporated with built-in BLUETOOTH/WIFI communication modules can serve as positioning landmarks in the earth positioning systems, too.

Base on the description above, the earth positioning system of the invention is capable of providing location-based services including the following:

Confirming the location of the user.
Tracking the location of the user.
Informing the user about his/her location.
Informing the other users about the locations of users related to the aforementioned user.
Displaying the location of the user on Google map, APPLE map or the indoor map.
Informing appropriate agencies when the user needs help.

Beside using the mobile communication device as the master node and using the fixed light source as the slave node, a positioning method of the earth positioning system can also use a mobile device as the slave node and use the fixed light source as the master node or a master-slave alternating node, so as to position the mobile device. Description to such positioning is as following.

Figure 6A:
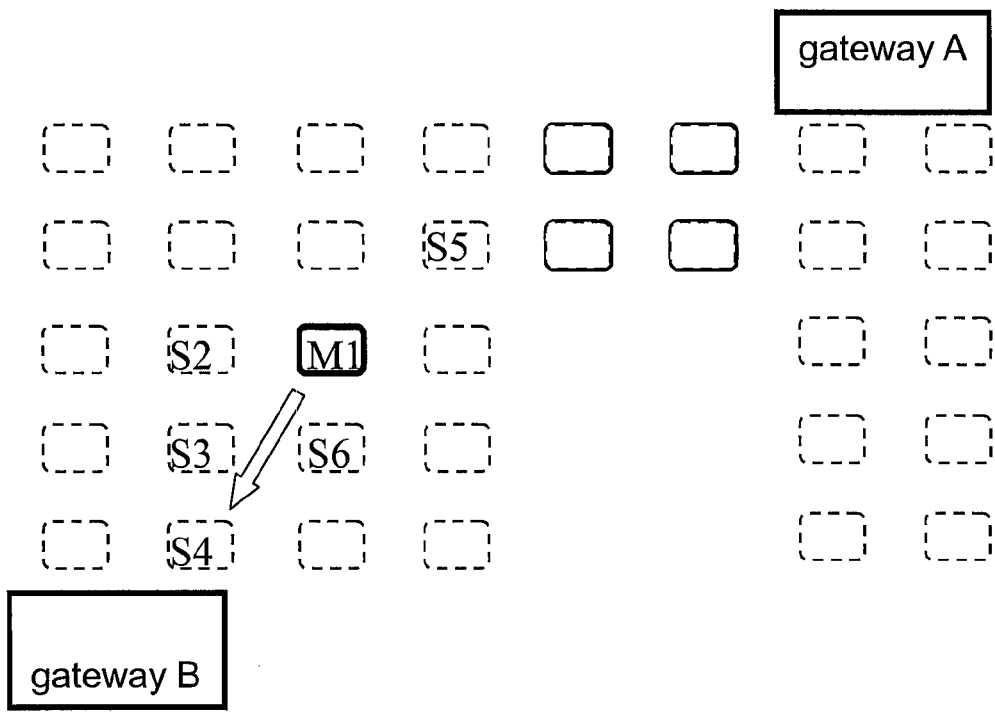
FIG. 6A and FIG. 6B are schematic diagrams of a smart networking sensor system according to an embodiment of the invention.
Figure 6B:
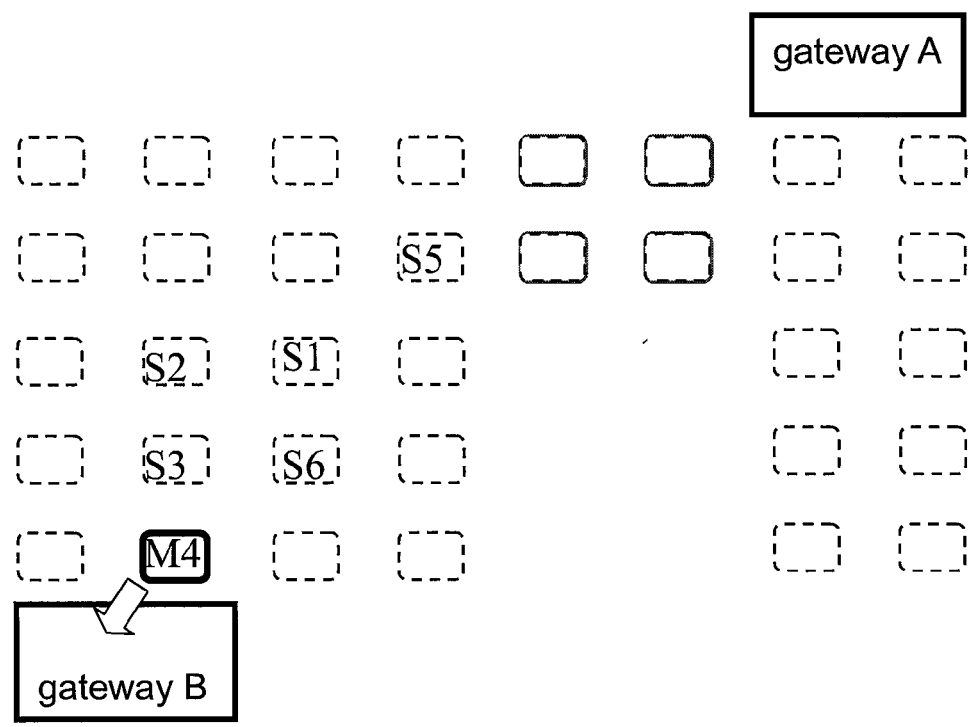

Data broadcasted by the slave node includes the MAC address, the coordinates of longitude and latitude and other measured result from the sensor integrated with the slave node. Each of the nodes also stores the coordinates of the gateways. As shown in FIG. 6, the BLUETOOTH LED lights belong to a two-dimensional distributed structure, in which each LED light can switch to the master node or the slave node at any time. A gateway, such as the gateway A or the gateway B in FIG. 6A and FIG. 6B, is an apparatus including a slave node and a device for connecting the cloud.

Step 1: Each of the LED lights usually assumes the BLUETOOTH master node which regularly scans the slave node of the mobile device nearby, and determines whether the slave node has entered its range. If such a slave node is present, such as the LED light M1 of FIG. 6A, proceed to the next step.

Step 2: The LED light M1 scans and identifies the slave nodes S2, S3, S4, S5 and S6 nearby, as shown in FIG. 6A. When the BLUETOOTH master node scans and obtains the MAC address, the coordinates of longitude and latitude and the RSSI value of a plurality of slave nodes nearby, distances of said slave nodes to the gateway can be calculated. Accordingly, the slave node having the closest distance to the gateway can then be obtained.

Step 3: Connect to the slave node S4 with the closest distance to the gateway B, and write the data of the slave node of the mobile device nearby into the slave node S4, as shown in FIG. 6A.

Step 4: The slave node S4 receiving the written data immediately converts into a BLUETOOTH master node M4, as shown in FIG. 6B. Step 2 is repeated until the data of the slave node of the mobile device are transmitted to the gateway B.

If the slave node of the mobile device is scanned by more than one LED light, the slave nodes of the LED lights can still convert into master nodes of the LED lights, and scan the LED light nodes nearby. After the scanning, if there is a connectable LED light slave node that accepts the data writing, the data can then be transmitted. Once the LED light master node has written the data into the selected LED light slave node, the LED light master node converts into an LED light slave node which lasts for a period of time (e.g. 60 seconds) as being the role of the LED light slave node. Accordingly, the worst case is that each of the LED light node has data to be transmitted, and the distance for transmission between each of the LED light nodes is 50 meters, which is the reliable communication distance between two adjacent LED light node with BLUETOOTH module. In this case, each slave node from the first slave node to the slave node closest to the gateway can successfully transmit its data to the gateway.

For the damaged node, the replacement and reconfiguration are simple since only the longitude and latitude of the gateway at each side, the longitude and latitude of the damaged node, and the related computing programs are required to write into the new node.

In summary, the EPS includes a plurality of fixed LED lights with wireless communication functions and a moving slave node. The role of each of the LED lights can be alternately switched between a master node and a slave node. Each of the LED lights is configured to wirelessly transmit the coordinates of longitude, latitude and altitude of the LED light itself. The moving slave node is capable of broadcasting data including a wireless communication module identification code and a measured value of the sensor integrated with the moving slave node. The LED lights are arranged in an indoor or outdoor environment, scanning the moving node nearby, so as to obtain a package composed of the wireless communication module identification code, the measured value of the sensor, a received signal-strength indicator (RSSI) value of the slave node and the coordinates of longitude, latitude and altitude of the LED lights. The LED lights can alternately switch their roles between master nodes and slave nodes and utilize multi-hop relay mechanism to transmit the package via the gateway to the cloud or receive the package via the gateway from the cloud.

As another embodiment of the EPS, the LED light includes a built-in dual-module of BLUETOOTH 4.0/WIFI capable of directly scanning the slave node of the mobile device. This is because the data broadcasted by the slave node includes the wireless communication module identification code and measured results of other sensors. After the scanning, the LED light sends the wireless communication module identification code and the measured results of other sensors of the slave node and the coordinates of longitude and latitude of the LED light to the cloud via the gateway through WIFI. The cloud can integrate the LED lights that scan the slave node at the same time and calculate the accurate coordinates of longitude, latitude and altitude of the slave node by triangulation, so as to accomplish the functions of positioning and tracking. In addition, since the BLUETOOTH 4.0 module of the mobile phone is basically a dual-mode module, and the BT4/WIFI Combo built in the LED light is also a dual-mode module, they can communicate directly with each other, so that the dimming control and the positioning can both be completed at the same time.

[Mobile Communication Device]

Figure 7:
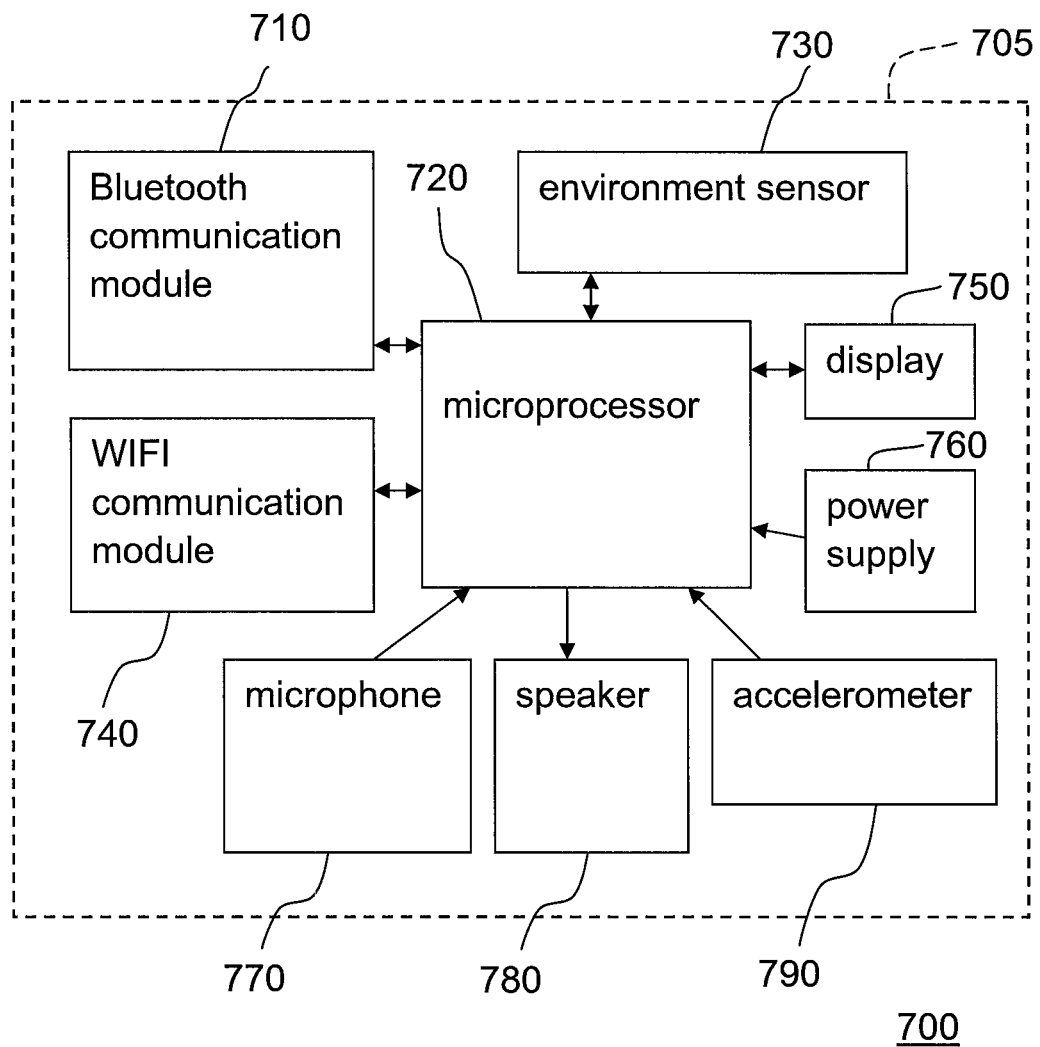
FIG. 7 is a schematic diagram of a mobile communication device according to an embodiment of the invention.

FIG. 7 is a schematic diagram illustrating a mobile communication device 700 according to an embodiment of the invention. The mobile communication device 700 of the invention refers to a device with at least the communication function of BLUETOOTH 4.0 and above and the WIFI communication function.

1. The mobile communication device 700 may be a wristband-type or glasses-type device for wearing in any occasion, which has advantages of light weight and is waterproof. The mobile communication device 700 has a housing 705 for accommodating the following elements.

2. A microcontroller or a microprocessor 720, served as a control unit, connected to the other circuit modules.

3. A BLUETOOTH (BT) 4.0 communication module 710 providing identity recognition, capable of communicating with an external LED light source with BLUETOOTH 4.0 function or a wearable sensor with built-in BLUETOOTH 4.0 function.

4. A WIFI communication module 740, capable of directly and wirelessly connecting to the cloud in a WIFI environment, so as to transmit sensing values of the wearable sensor to the cloud. The transmission power of the WIFI communication module 740 is adjustable, so as to avoid excessive power consumption.

5. A power supply 760 for supplying power required by circuit elements of the mobile communication device 700. It is generally more appropriate to implement the power supply 760 with a battery.

The following elements may also be included in the mobile communication device 700.

A. A display 750, which may be an LCD display or a touch display.

B. At least one microphone 770 providing an input interface for speech recognition and an output interface so that a cloud computer may perform cloud speech recognition (CSR) based on the speech recognition and the user can seek help directly through speech. The mobile communication device 700 is configured to send a request for help based on the speech recognition. The microphone 770 enables a sound recording function of the mobile communication device 700.

C. At least one speaker 780 providing an interface for transmitting human voice of friends or relatives or caregivers received through the cloud and a wireless network, which is similar to a walkie-talkie. However, the transmission operates mainly base on the cloud and a wireless network, which may require payments to the system operator. The speaker can also transmit the human voice through a wireless earphone such as a BLUETOOTH earphone.

D. An environment sensor 730 including built-in BLUETOOTH 4.0 function, capable of collecting information for determining whether the environment is harmful to human body.

E. A built-in accelerometer 790 for recording activities of the user, with built-in heartbeat measurement for obtaining an activity intensity of the user.

It should be noted that, a mobile phone with BT 4.0 can also achieve the same functions of the wristband-type mobile communication device as mentioned above. For instance, the mobile phone above may be a mobile phone which supports Android 4.3 and above, such as HTC, Samsung or iPhone 4S or 5 series. Said functions can be programmed as an APP for the mobile phone. Of course, the wristband-type mobile communication device also requires an operating system as well as utility programs. The wristband-type mobile communication device only provides necessary functions, thus: a photographic function is not required; a big screen is not required; a wireless communication function for long distance is not required (e.g., GSM, GPRS, 3G, 4G and so on). The wristband-type mobile communication device comes with a waterproof design and can be worn in any occasion.

The wireless communication module is one selected from a group consisting of BLUETOOTH module, BLUETOOTH low energy consumption (BLE) module, ANT module, ANT+ module, Zigbee module, and a combination of the modules above.

The role of each of the aforementioned lower energy consumption communication modules supporting BLUETOOTH 4.0, ANT, ANT+, and/or Zigbee can be alternately switched between a master node and a slave node; after the master node calculates the coordinates of longitude, latitude and altitude of the mobile communication device, the master node converts into the slave node to broadcast the coordinates of longitude, latitude and altitude of the mobile communication device to the outside; and the low energy consumption communication module/WIFI COMBO module scans the slave node so as to obtain the coordinates of longitude, latitude and altitude of the mobile communication device and send those coordinates to the cloud through WIFI.

The role of each of the aforementioned lower energy consumption communication modules supporting BLUETOOTH 4.0, ANT, ANT+, and/or Zigbee can be alternately switched between a master node and a slave node; after the master node calculates the coordinates of longitude, latitude and altitude of the mobile communication device, the master node converts into the slave node to broadcast the coordinates of longitude, latitude and altitude of the mobile communication device to the outside; and the low energy consumption communication module/gateway scans the slave node so as to obtain the coordinates of longitude, latitude and altitude of the mobile communication device and send those coordinates directly to the cloud.

The First Embodiment

Figure 8:
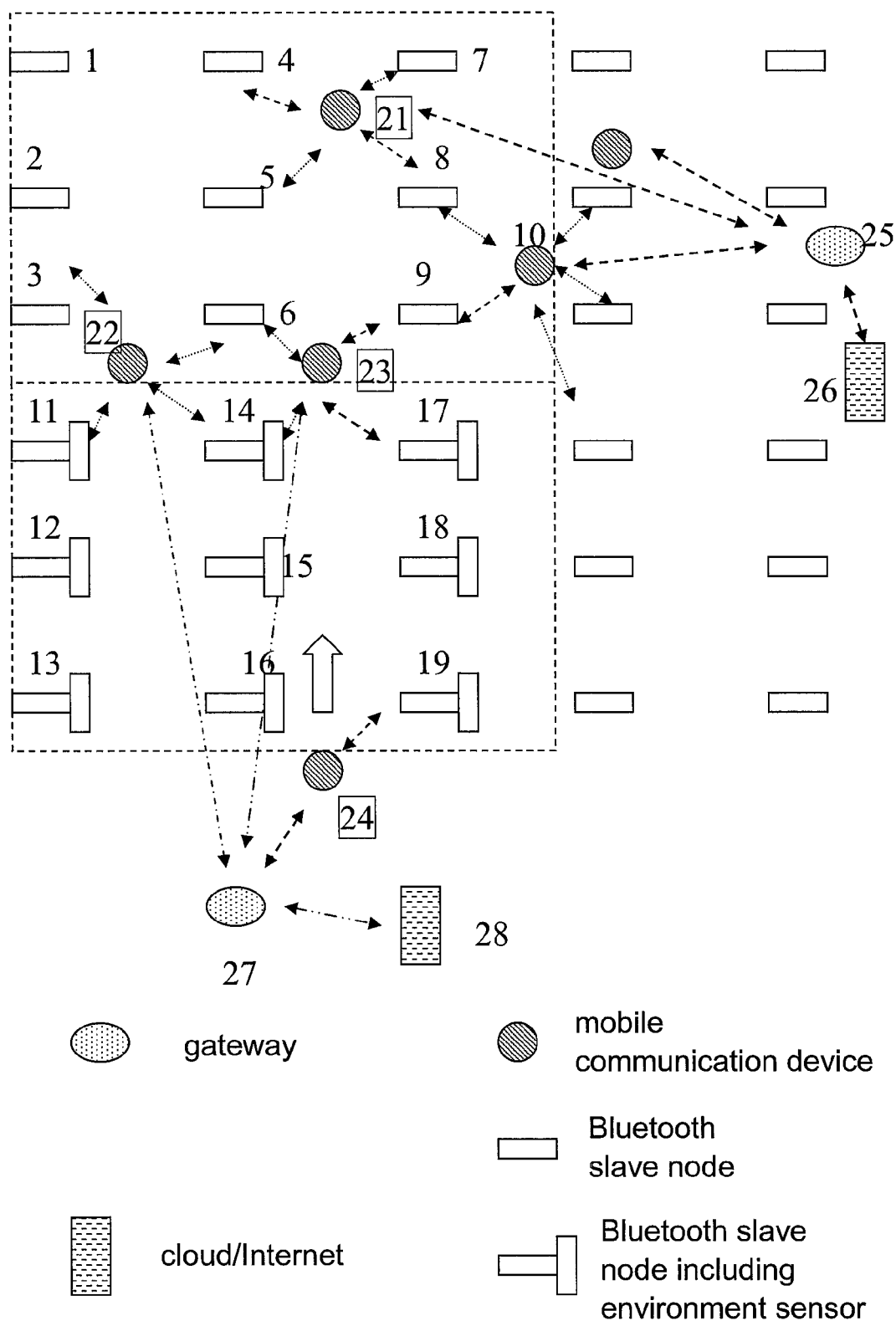
FIG. 8 is a schematic diagram of a smart networking sensor system according to another embodiment of the invention.

FIG. 8 illustrates a preferable embodiment for arranging the LED light sources, in which each of the LED light sources includes a built-in BLUETOOTH 4.0 chip module, and a person beneath the light source carries a mobile communication device. The communication specification of BLUETOOTH 4.0 provides a quicker scanning function. Basically, the time required for the master node to scan 40 slave nodes is less than one second. Accordingly, the invention is capable of positioning the location of the user, no matter when the user is static or moving. This is a function that BLUETOOTH 2.0 or 3.0 or ZIGBEE cannot achieve. In other words, the invention has proposed an inventive function for dynamical indoor positioning.

An embodiment of the BLUETOOTH 4.0 chip module is a T1 CC2540/CC2541 system-on-a-chip. The chip includes the communication function of BLUETOOTH 4.0, and also includes an 8051 microprocessor and an ADC converter capable of connecting to inputs of eight sensing signals so as to connect to the environment sensors. In certain embodiments, the measured values of the environment sensors can also be read and sent to the cloud while the mobile communication device is reading the wireless communication identification of the light source.

WIFI as depicted in FIG. 8 also refers to Wi-Fi Direct, which allows the devices to directly communicate with each other without connecting to any accessing point. This allows the communication between the devices to be simpler and quicker, and the connection can also be done at anytime, anywhere.

The gateway 27 of FIG. 8 may be a home computer, a personal computer, a notebook computer, a mobile phone or a tablet computer. Each said device already includes a built-in BT4.0+WIFI combination chip, and is capable of becoming the gateway 27 owing to their wired or wireless connectabilities, and thus the cloud 28 can be easily connect to access the calculation services.

Despite that the mobile communication devices of FIG. 8 are illustrated by using portable or wearable devices, however, a part of the mobile communication devices can also be of a fixed type. In other words, the portable mobile communication device may be fixed at an indoor or outdoor location where movements of people and objects are not blocked, and the gateway and the mobile communication device can communicate and link to each other through WIFI. This is to say, even if there is no person that is beneath a smart networking light source and carries the mobile communication device to provide commands, the WIFI module of the gateway and the WIFI module of the fixed mobile communication device can communicate with and connect to each other remotely through Internet and the cloud, and then a BLUETOOTH dual-mode node of the fixed mobile communication device can still monitor and control all the devices having the BLUETOOTH node in FIG. 8. For instance, the LED light source can be subject to the dimming controls or the color changing, or can be turned on or off. A sensor on the LED light source can be read, and appliances having BLUETOOTH interface can be turned on or off or be monitored. A robot can be monitored or given orders.

In case the space for deploying the smart networking light sources is not large enough, and the communication distance of BLUETOOTH is between 10 to 30 meters, the gateway with built-in BT4.0+WIFI combination chip can monitor and control the LED light sources, the appliance, the sensors or the robots having the BLUETOOTH node, directly through the BLUETOOTH 4.0 interface.

In addition, by utilizing the Internet interface of the LED light sources, the triangulation can be performed to determine the distance between the person carrying the wristband-type mobile communication device or the mobile phone and an on-site applied appliance (slave node), so that the gateway can then decide whether to put the appliance in a turn-off state, warm booted state or turn-on state according to the distance and the type of the on-site applied appliance. Alternatively, the mobile communication device carried by the user may obtain a wireless communication identification and an RSSI value of the on-site applied appliance nearby by scanning the on-site applied appliance, so that the gateway can then decide whether to put the appliance in a turn-off state, warm booted state or turn-on state according to the RSSI value and the type of the on-site applied appliance.

The on-site applied appliance may be an air conditioning system such as an electric fan, an electric heater fan, an air conditioner, a lamp, an LED light, an illumination apparatus, a computer or a television. Take the LED light for example, the gateway may decide whether to turn off or brighten the LED light or change the color of the LED light according to at least one of the distance, the sunrise time and the sunset time of the location of the LED light. Alternatively, the gateway may decide whether to turn off or brighten the LED light or change the color of the LED light according to at least one of the RSSI value, the sunrise time and the sunset time of the location of the LED light. In addition, the on-site applied appliance may be an outdoor lawn sprinkler. When a mobile communication device approaches the sprinkling range of the lawn sprinkler, the lawn sprinkler may stop sprinkling or reduce its sprinkling range temporarily until the mobile communication device moves away.

Figure 9:
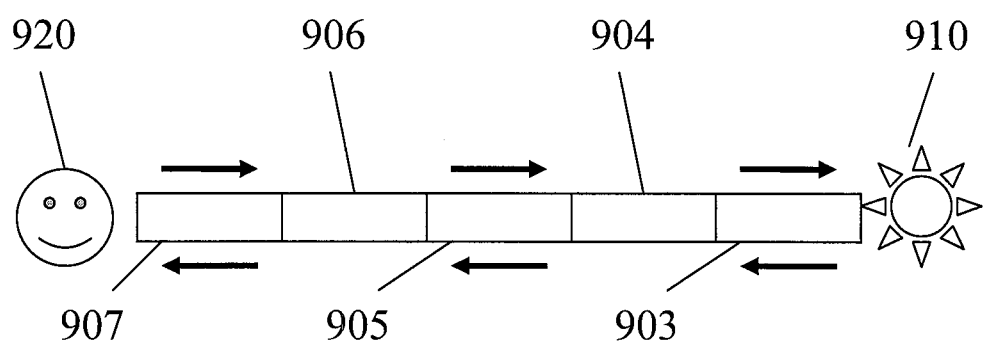
FIG. 9 is a schematic diagram illustrating a user and an on-site applied appliance according to an embodiment of the invention.

For example, FIG. 9 illustrates a user 920 and an on-site applied appliance 910 according to an embodiment of the invention. The decision whether the appliance is in a turn-off state, warm booted state or turn-on state is based on the position of the user 920, especially the distance between the user 920 and the on-site applied appliance 910. As shown in FIG. 9, whether turning on or turning off the on-site applied appliance 910 may be determined according to an estimated distance or an RSSI value between the user 920 and the on-site applied appliance 910. The estimated distance may be derived from the time required for cold booting or warm booting the on-site applied appliance 910 and the walking speed of the user 920. The distance between the user 920 and the on-site applied appliance 910 may be divided into five zones 903-907. Appliances such as televisions, computers or air conditioners may be cold booted or warm booted due to their long activation time.

When the user 920 is in the zone 903, the on-site applied appliance 910 is assigned to a turn-on state.

When the user 920 is in the zone 905, the on-site applied appliance 910 is assigned to a warm boot idle state.

When the user 920 is in the zone 907, the on-site applied appliance 910 is assigned to a turn-off state.

When the user 920 is moving from the zone 906 to the zone 905, the on-site applied appliance 910 is switched to a warm boot state. When the user 920 is moving from the zone 906 to the zone 907, the on-site applied appliance 910 is switched to the turn-off state. When the user 920 just stays in the zone 906, the state of the on-site applied appliance 910 remains unchanged.

When the user 920 is moving from the zone 904 to the zone 903, the on-site applied appliance 910 is switched to the turn-on state. When the user 920 is moving from the zone 904 to the zone 905, the on-site applied appliance 910 is switched to the warm boot state. When the user 920 just stays in the zone 904, the state of the on-site applied appliance 910 remains unchanged.

For example, assume the on-site applied appliance 910 is an LED light. The LED light does not need the warm boot state. When the user 920 is leaving the nearest zone 903 and is moving away from the LED light 910, the LED light may be turned off. When the user 920 is approaching the nearest zone 903 and is moving closer to the LED light 910, the LED light may be turned on. For example, the span of the zone 903 may be three meters.

In the foregoing description, although the user mainly refers to a person, practically, the user can also refer to a pet, an animal, a plant, a robot, an important equipment, a fixed appliance, a moving appliance, or a moving carrier or vehicle, as long as the user is carrying the mobile communication device of the invention.

Positioning function: Case 1, which refers to FIG. 8.

FIG. 8 shows a plurality of BLUETOOTH slave nodes, such as BLUETOOTH slave nodes 1-9. FIG. 8 further shows a plurality of BLUETOOTH slave nodes including environment sensors, such as BLUETOOTH slave nodes 11-19. FIG. 8 further shows a plurality of mobile communication devices, such as mobile communication devices 10 and 21-24. FIG. 8 further shows gateways 25 and 27 and cloud/Internet 26 and 28.

1. A mobile communication device 21 scans the coordinates and the RSSI value of BLUETOOTH slave nodes (e.g., 4, 7, 5, 8) of the light sources nearby; or a mobile communication device 22 scans the coordinates and the RSSI value of the BLUETOOTH slave nodes (e.g., 3, 6, 11, 14) of the light sources nearby.

2. The mobile communication device 21 directly calculates the coordinates and the RSSI values of the four BLUETOOTH slave nodes by utilizing triangulation, so as to obtain the location of the mobile communication device 21. Similarly, the 3-D coordinates of the location of the mobile communication device 22 can also be calculated accordingly.

3. The mobile communication device 21 transmits the 3-D coordinates of the location of the mobile communication device 21 to a WIFI access point (AP) or a gateway 25 through WIFI, and then sends the same 3-D coordinates to the Internet or a cloud 26. The mobile communication device 22 transmits the 3-D coordinates of the location of the mobile communication device 22 to a WIFI access point (AP) or a gateway 27 through WIFI, and then sends the same 3-D coordinates to the Internet or a cloud 28. Next, by referring to a 3-D spatial map, it is determined whether the mobile communication device 21 or 22 is located in a room with a special property such as a bathroom, a kitchen, a classified room or a restricted room, or whether a related location-based service (LBS) is available.

4. The property or the related location-based service is sent back from gateway 25/cloud 26 and gateway 27/cloud 28 to the mobile communication device 21 and the mobile communication device 22, respectively. Alternatively, the property or the related location-based service may be provided to the caregivers or the monitoring personnel as references. Moreover, the mobile communication device 21 and the mobile communication device 22 can also be requested to provide sensing values of the wearable sensor on the user, or sensing values of the environment sensors on the LED light sources nearby.

Positioning function: Case 2, which refers to FIG. 8.

1. A mobile communication device 23 scans the coordinates and the RSSI value of BLUETOOTH slave nodes (e.g., 6, 9, 14, and 17) of the light sources nearby.

2. The mobile communication device 23 calculates the coordinates and the RSSI values of the four BLUETOOTH slave nodes by utilizing triangulation, so as to obtain a 3-D coordinates of the location of the mobile communication device 23. Next, the mobile communication device 23 transmits the 3-D coordinates of the location of the mobile communication device 23 and the sensing values of the environment sensors on the LED light sources 14 and 17 to a WIFI access point (AP) or a gateway 27 through WIFI, and then sends the same 3-D coordinates and sensing values to the Internet or the cloud 28.

3. According to a 3-D spatial map preset in the cloud, the cloud determines whether the mobile communication device 23 is located in a room with a special property such as a bathroom, a kitchen, a classified room or a restricted room. According to the sensing values of the environment sensors of the LED light sources 14 and 17, the cloud determines whether there is a dangerous condition in the environment. For instance, when there is too much carbon dioxide in the air, the mobile communication device 23 may display a message showing "improper ventilation". Or, when there is too much carbon monoxide in the air, the mobile communication device 23 may display a message showing "harmful ventilation", which is dangerous and requires immediate attention.

4. Said messages related to the dangerous location are then sent back to the mobile communication device 23 as references for the caregivers and the monitoring personnel to request the user carrying the mobile communication device 23 to deal with the condition immediately. The foregoing steps are repeated to continue the tracking and monitoring until the crisis is resolved.

The environment sensor is one selected from a group consisting of a gas sensor, a sensor for airborne pathogens, a thermometer, a hygrometer, a manometer, an illuminometer, a flowmeter and a hydrometer.

Of course, in foregoing Case 2, the sensing values of the wearable sensors on the user carrying the mobile communication device 23 may also be sent to the cloud for monitoring and management, so that all sorts of appropriate solutions can be instantly provided back to the user. A wearable sensor may be a plantar pressure sensor, a triaxial accelerometer, a gyro, a digital compass, an electroencephalogram sensor, an electrocardiography, a transdermal sensor, an implantable sensor, an oximeter, a glucosemeter, an electromyography (EMG) or a sphygmomanometer.

The embodiment can further be applied in urban management. For instance, by having citizens carrying the mobile communication devices, statuses in city can also be provided to municipal government and public agencies. Of course, the statuses may also be provided by public officials such as policemen carrying the mobile communication devices. As long as the LED light sources are installed with related sensors, more details (e.g., air quality) regarding the location can be obtained. The statuses can be instantly displayed on GOOGLE MAP, so that the municipal government can manage and improve the city according to said information.

The Second Embodiment

Figure 10:
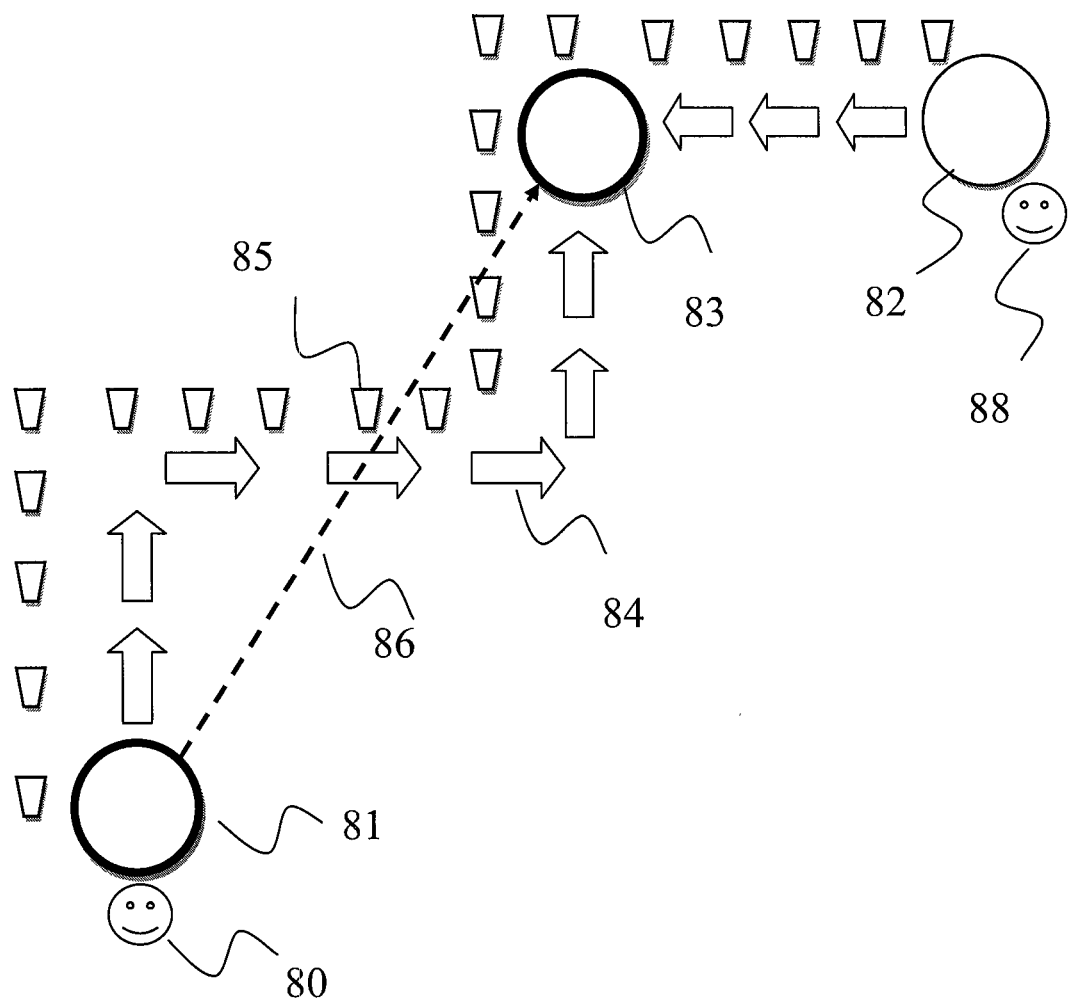
FIG. 10 is a schematic diagram illustrating interactions between the mobile communication device and the LED light sources nearby according to an embodiment of the invention.

In case neither the map information for providing a correct route or the best route nor the EPS with the cloud or the Internet is provided, the user carrying the mobile communication device may move towards the target only by recognizing the coordinates of longitude, latitude and altitude. As shown in FIG. 10, a plurality of BLUETOOTH LED lights are already arranged, such as the BLUETOOTH LED light 85. In case a target location 83 is indoor and a starting location 81 is outdoor, a user 80 carrying the mobile communication device can move forward according to an instructed direction or a shortest distance 86 between the two locations 81 and 83. The user 80 carrying the mobile communication device may detour when obstructions (such as stairs or dead ends) are encountered. No matter where the user goes, the coordinates of longitude, latitude and altitude of the mobile communication device may be obtained by receiving the coordinates of longitude, latitude and altitude of the BLUETOOTH LED lights nearby. Accordingly, the user can move towards the correct direction to the target location 83 without getting lost, and the route for reaching the target location 83 is shown by a plurality of arrows 84. Similarly, another user 88 carrying another mobile communication device can also move from a starting location 82 and reaches the target location 83 accordingly.

In case the map information and the EPS provided with the cloud and the Internet are available, the following embodiment may be realized. Please refer to FIG. 8 for the following discussions.

The user carrying a mobile communication device 24 may set his/her destination to be the location of LED light 7 by using the mobile communication device 24, then the cloud can immediately be informed that the mobile communication device 24 is located between LED lights 16 and 19. Next, the best route which leads to north is provided. As the user moves on, the positioning and the tracking are constantly performed as to provide further instructions to the user, such that it can be ensured that the user can successfully reach the location of the LED light 7.

A navigation function as described above can provide advanced location-based services such as a group meeting at a predetermined location. First, a meeting place is sent and recorded in the mobile phone of each user who intends to attend the group meeting. Next, each user simply activates the APP before an agreed meeting time, and the location of each user is instantly displayed on a map (such as GOOGLE MAP)

of the mobile phone. Lastly, according to instructions shown on the map, each user can eventually move to the predetermined location of the group meeting in time.

Such location-based service can control and estimate the time for each user, so to prevent the user from arriving late. When it comes to a meeting on the predetermined location with unfamiliar friends, or regrouping after a group of users being separated, unnecessary waiting and anxiety can also be avoided.

Such location-based service may also apply to a car-parking APP for reserving a parking space in advance, so that the user can estimate the time required for parking the car. By using the same techniques for the group meeting on the predetermined location, the car can release a request for a parking space, so that the cloud can perform a matching process according to parking spaces released by parking lots, and guide the car to reach the reserved parking space. An essential condition of the matching process is that the distance between the car and the closest parking space needs to be predetermined. In principle, said APP can help with reserving a parking lot in advance. However, the matching system starts guiding the car only when the car is on the road and the distance between the car and the parking space is short enough such that the cat can reach the parking space in a preset time (e.g., 5 minutes).

The Third Embodiment

Location-Based Service

In order to prevent theft, a car owner is likely to adopt a wireless communication identification which is more powerful than an E-tag. When a car is driven away from the parking space, a signal of an accelerometer of the slave node of the LED street light can be read, and sent to the mobile phone for confirmation. In case the mobile phone grants the confirmation, the cloud stops tracking. In case the mobile phone denies the confirmation, the cloud determines that the car is stolen and starts tracking the location of the car.

A camera and a wireless communication module may be arranged in a large crossroad to aid said confirmation. Once the camera identifies that a car is passing by and the car has no wireless communication identification to be read, it is then determined that the wireless communication identification of the car may be turned off or destroyed. The camera can also determine whether the wireless communication identification has been changed by checking whether there is any discrepancy regarding the color or the shape of the car corresponding to the wireless communication identification. In case any problem occurs, an operator at the cloud can then manually determine what the problem is. Accordingly, vehicles will be less prone to theft.

The Fourth Embodiment

Monuments, Museums, Exhibitions, City Guides

A backpacking guide APP including user interfaces in various languages is provided, and capable of providing random guiding and ubiquitous guiding to the user through WIFI or the cloud.

The location of the LED light is taken as a trigger point for the cloud guiding. Since there are LED street lights or floor lights near monuments or city attractions such as the 101 Building, the Grand Canyon, or the Eiffel Tower, a traveler can obtain correct voice guiding by activating the corresponding APP. The APP may include functions such as: 1. Various languages to be selected; 2. Maps provided for indoor and outdoor positioning; 3. Detailed introductions of the attraction in both illustrations and texts with selectable detail levels; 4. Purchasable souvenirs.

Before entering a museum or an exhibition, must-see exhibits or booths may be pre-selected and the coordinates of the LED lights corresponding to the exhibits or booths may be provided. Next, the technology of the group meeting on the predetermined location as described in the second embodiment may be utilized, so each of the must-see booths can be reached in order, or randomly. Every time one of the booths has been visited, the coordinates of the corresponding LED light on the map may be eliminated until all of the booths are visited. Moreover, the time and the frequency of the user's visit to certain exhibit may also be recorded, so that interests of the visitor in purchasing the exhibit or its duplicates may be obtained.

The Fifth Embodiment

Map Data Records

No matter the user is indoor or outdoor, the mobile communication device of the EPS of the present invention can automatically embed the current time and the accurate coordinates of longitude, latitude and altitude of the fixed LED light obtained by scanning the LED light and triangulation calculation into audio files, photos and videos obtained by utilizing functions including voice recording, photo taking and video recording of the mobile communication device. Furthermore, the mobile communication device may also embed the sensing data of the environment sensor obtained from scanning the LED light as well as the data of the wearable sensor on the user of the mobile communication device into the aforementioned audio files, photos and videos.

The Sixth Embodiment

Crime Prevention

Crime activities may occurs in an indoor environment as well as an outdoor environment, thus it is very important to provide the coordinates of longitude and latitude for both the indoor environment and the outdoor environment when the user uses the mobile phone to report a crime incident. The LED lights according to the design of the invention can provide indoor coordinates of longitude, latitude and altitude, thus, in case the emergency call number 911 is dialed by using the mobile phone, or a SOS button on the APP of the mobile phone is pressed, the mobile phone may connect immediately to a police security network, and the mobile phone may provide the coordinates of longitude, latitude and altitude to a visualized map of the police security network. Accordingly, police can react immediately with respect to the location of the coordinates of longitude, latitude and altitude, and the time for the police to reach said location can also be substantially reduced. Meanwhile, since the police on duty (even plainclothes police) can all receive messages of the location-based service, helps can be immediately provided. As a result, police visibility can also be increased so as to decrease crime rate.

The earth positioning system can also be utilized in police operations together with geographic information system (GIS) data and an automatic vehicle locator (AVL) system. The GIS used in police department can store locations and addresses of crime incidents in a center database, so that they can be visualized on a digital map, and models of crime patterns can also be built accordingly, so as to predict the crime activities. Geocoding of the data from the police can also be included in a moving map of the AVL system, so that the police can constantly obtain information regarding locations of incidents and persons need to be noted (e.g., sex offenders, parolees, gangsters). The visualization of the instant message can facilitate the quality of services provided by the police and help with monitoring parolees or identifying crime patterns.

Furthermore, a citizen reporting hot-line web site can also be built according to the invention, in which citizens can take photos of illegalities or irregularities by using the mobile communication device, and send the photo or video together with the time and the accurate location to the web site. Accordingly, an instant reporting can be accomplished so as to facilitate the government and police department for managing the city, thereby further increasing the police visibility.

In summary, the invention is directed to an earth positing system (EPS) which is a smart networking system for accurate positioning in both indoor and outdoor environments. The EPS is composed of a network of LED lights provided with the communication function of BLUETOOTH 4.0 and above, a mobile communication device also provided with the communication function of BLUETOOTH 4.0 and above, a WIFI network and a cloud. Advantages of the EPS over conventional GPS are as listed below.

GPS can easily be influenced by shelters of heavy clouds or high buildings, or even rain, which results in that a GPS location cannot be obtained by the mobile phone. EPS is not influenced by climate issues or the shelters of heavy clouds or high buildings, so that the mobile phone can be located as long as there is a LED light nearby.

As long as there is an LED light nearby, the EPS can locate the mobile phone at any indoor corner, regardless of which floor it is at, or whether it is in a basement. The GPS is incapable of such locating.

The mobile phone of the EPS can automatically scan the coordinates of the LED light. The mobile phone can directly read the BLUETOOTH signal from the LED light to obtain the coordinates, without the mobile phone connecting to Internet. As a result, the positioning based on the coordinates can be done without being influenced by network dead zones. The mobile phone can directly perform the dimming controls or the color changing of the LED light sources. The GPS is incapable of the functions above.

A smart networking system for both indoor and outdoor environments can be constructed by using the EPS connecting to the wearable sensor through the mobile communication device of the EPS, together with the combination of the LED lights and the environment sensors. The GPS is incapable of such construction.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An earth positioning system, comprising:
  a plurality of fixed positioning landmarks with wireless communication functions, each of the positioning landmarks being configured to wirelessly transmit coordinates of longitude, latitude and altitude of the positioning landmark, wherein each said positioning landmark is an outdoor light, an indoor light or a fixed electric household appliance;
  a mobile communication device configured to receive the coordinates of longitude, latitude and altitude and a received signal-strength indicator (RSSI) value or channel response of at least one of the positioning landmarks,
  wherein the plurality of positioning landmarks are arranged in an indoor environment or an outdoor environment, and when the mobile communication device moves along with a user, the mobile communication device obtains coordinates of longitude, latitude and altitude of the mobile communication device by constantly scanning the coordinates of longitude, latitude and altitude and the RSSI values or the channel responses of the positioning landmarks nearby and calculating the coordinates of the mobile communication device directly in the mobile communication device,
  wherein the coordinates of longitude, latitude and altitude of positioning landmarks written into the positioning landmarks by the mobile communication device are obtained previously from a Google map or an Apple map or an indoor map, and the wireless communication functions of the plurality of fixed positioning landmarks and a communication function of the mobile communication device are respectively comprising communication functions of Bluetooth 4.0 and above.

2. The earth positioning system of claim 1, wherein each said positioning landmark is a light-emitting diode (LED) light and comprises:
  a substrate;
  at least one LED die fixed on the substrate;
  a control unit fixed on the substrate, electrically connected to the LED die, and storing the coordinates of longitude, latitude and altitude of the positioning landmark;
  a wireless communication module fixed on the substrate, electrically connected to the control unit, and configured to wirelessly transmit the coordinates of longitude, latitude and altitude of the positioning landmark;
  a power supply fixed on the substrate, and configured to supply power to the LED die, the control unit and the wireless communication module; and
  a housing.

3. The earth positioning system of claim 2, wherein the wireless communication module includes at least one of a BLUETOOTH module, a BLUETOOTH low energy (BLE) module, a WIFI module, an ANT module, an ANT+ module, and a Zigbee module.

4. The earth positioning system of claim 1, further comprising:
  a cloud computer, wherein the mobile communication device transmits the coordinates of longitude, latitude and altitude of the mobile communication device to the cloud computer, and the coordinates of the mobile communication device are incorporated into a map of the cloud computer, and the coordinates and the map are provided to devices connected to the cloud computer for browsing and using.

5. The earth positioning system of claim 4, wherein the cloud computer sends the coordinates back to the user for navigation or to related caregivers or monitoring personnel for remote care or monitoring.

6. The earth positioning system of claim 4, wherein the mobile communication device further comprises:
  at least one microphone providing an input interface for speech recognition and an output interface, wherein the cloud computer performs cloud speech recognition based on the speech recognition, wherein the mobile communication device is configured to send a request for help based on the speech recognition or the mobile communication device includes a sound recording function.

7. The earth positioning system of claim 1, wherein the mobile communication device is worn by a user and a communication function of the mobile communication device includes at least one of BLUETOOTH, BLUETOOTH low energy, WIFI, ANT, ANT+, and Zigbee.

8. The earth positioning system of claim 7, wherein the mobile communication device is a mobile phone, a tablet computer, a notebook computer, a wrist-type mobile communication device or a wearable mobile communication device.

9. The earth positioning system of claim 7, wherein the user is a human, an animal, a plant, a fixed appliance, a moving appliance or a robot.

10. The earth positioning system of claim 7, wherein a triangulation is performed for the user carrying the mobile communication device to obtain a distance between the user and a slave node appliance nearby, and a gateway determines whether the slave node appliance is turned off, warm booted or turned on according to the distance and a type of the slave node appliance.

11. The earth positioning system of claim 7, wherein the mobile communication device carried by the user obtains an RSSI value or channel response of a slave node appliance nearby by scanning the slave node appliance, and whether the slave node appliance is turned off, warm booted or turned on is determined according to the RSSI value or the channel response and a type of the slave node appliance.

12. The earth positioning system of claim 7, wherein the mobile communication device carried by the user is positioned by triangulation, so that a distance between the user and a said positioning landmark nearby is obtained, and whether the positioning landmark is turned off, brightened or color-changed is determined according to at least one of the distance, a sunrise time and a sunset time of a location of the positioning landmark.

13. The earth positioning system of claim 7, wherein the mobile communication device carried by the user obtains the RSSI value or the channel response of a said positioning landmark nearby by scanning the positioning landmark, and whether the positioning landmark is turned off, brightened or color-changed according to at least one of the RSSI value or the channel response, a sunrise time and a sunset time of a location of the positioning landmark.

14. The earth positioning system of claim 1, wherein a wireless sensor network system is composed of the mobile communication device reading and collecting data from a wearable sensor on the user through wireless communication, together with the coordinates, wherein the wearable sensor on the user includes a communication function of BLUETOOTH 4.0 or above or WIFI.

15. The earth positioning system of claim 14, wherein the wearable sensor includes at least one of a plantar pressure sensor, a triaxial accelerometer, a gyro, a digital compass, an electroencephalogram sensor, an electrocardiography, a transdermal sensor, an implantable sensor, an oximeter, a glucose meter, an electromyography (EMG) and a sphygmomanometer.

16. The earth positioning system of claim 1, wherein a wireless sensor network system is composed of the mobile communication device reading and collecting data from an environment sensor mounted on a said positioning landmark near the user, together with the coordinates.

17. The earth positioning system of claim 16, wherein the environment sensor includes at least one of a gas sensor, a sensor for airborne pathogens, a thermometer, a hygrometer, a manometer, an illuminometer, a flowmeter or a hydrometer.

18. The earth positioning system of claim 1, wherein the mobile communication device further comprises:
at least one speaker providing an interface for transmitting human voice received through a cloud and a wireless network, wherein the speaker transmits the human voice through a wireless earphone.

19. The earth positioning system of claim 1, wherein each said positioning landmark is a floor light, a solar energy floor light, a road light, a solar energy road light, or an electric household appliance that is fixed in a house and the electric household appliance is a refrigerator, a television, a washing machine, a dishwasher, a printer, a microwave oven, a baking oven, or an electronic device incorporated with a built-in BLUETOOTH/WIFI communication module.

20. The earth positioning system of claim 1, wherein the mobile communication device is fixed on an indoor location or an outdoor location, where movements of people or objects are not blocked, wherein a WIFI module of a gateway and a WIFI module of the fixed mobile communication device communicate with and link to each other through Internet and a cloud remotely, wherein every device having a wireless node is monitored and controlled by a wireless dual-mode node of the fixed mobile communication device.

21. The earth positioning system of claim 1, wherein the mobile communication device automatically records current time and embedded data in audio files, photos and videos obtained by utilizing functions of the mobile communication device including sound recording, photo taking and video recording, wherein the embedded data includes at least one of accurate coordinates of longitude, latitude and altitude obtained from calculation based on scanning the fixed positioning landmarks, an environment sensing data scanned and obtained from the positioning landmarks, and the data of the wearable sensor worn by the user of the mobile communication device.

22. The earth positioning system of claim 1, wherein the mobile communication device includes a lower energy consumption communication module that supports at least one of BLUETOOTH 4.0, WIFI, ANT, ANT+, and Zigbee, the lower energy consumption communication module is configured to alternately switch its role between a master node and a slave node; after the master node calculates the coordinates of longitude, latitude and altitude of the mobile communication device, the master node converts into the slave node to broadcast the coordinates of longitude, latitude and altitude of the mobile communication device to outside; and the low energy consumption communication module or a WIFI COMBO module scans the slave node so as to obtain the coordinates of longitude, latitude and altitude of the mobile communication device and send the coordinates to a cloud through WIFI.

23. The earth positioning system of claim 1, wherein the mobile communication device includes a lower energy consumption communication module that supports at least one of BLUETOOTH 4.0, WIFI, ANT, ANT+, and Zigbee, the lower energy consumption communication module is configured to alternately switch its role between a master node and a slave node; after the master node calculates the coordinates of longitude, latitude and altitude of the mobile communication device, the master node converts into the slave node to broadcast the coordinates of longitude, latitude and altitude of the mobile communication device to outside; and the low energy consumption communication module or a gateway scans the slave node so as to obtain the coordinates of longitude, latitude and altitude of the mobile communication device and send the coordinates directly to a cloud.

24. An earth positioning system, comprising:
a plurality of fixed positioning landmarks with wireless communication functions, each of the positioning landmarks being configured to wirelessly transmit a unique identification code of the positioning landmark, wherein each said positioning landmark is an outdoor light, an indoor light or a fixed electric household appliance;
at least one mobile communication device configured to receive the unique identification code of at least one of the positioning landmarks; and
a cloud computer storing at least one map marked with coordinates of longitude, latitude and altitude of the fixed positioning landmarks;
wherein the plurality of positioning landmarks are arranged in an indoor environment or an outdoor environment, and when the at least one mobile communication device moves along with its carrier, the at least one mobile communication device constantly scans and obtains the unique identification codes and received signal-strength indicator (RSSI) values or channel responses of wireless communication modules of the positioning landmarks nearby, and the at least one mobile communication device wirelessly uploads the unique identification codes and the RSSI values or the channel responses to the cloud computer, and the cloud computer calculates coordinates of longitude, latitude and altitude of the at least one mobile communication device based on the unique identification codes and the RSSI values or the channel responses, and the cloud computer provides the coordinates to devices connected to the cloud computer for browsing and using,
wherein the at least one mobile communication device writes the RSSI values to the positioning landmarks, the positioning landmarks collect the written RSSI values from the at least one mobile communication device nearby to perform a dimming control, and each of the positioning landmarks performs the dimming control according to a RSSI value with the highest signal strength of the RSSI values collected from the at least one mobile communication devices within a period of time.

25. The earth positioning system of claim 24, wherein each said positioning landmark is a light-emitting diode (LED) light and comprises:
a substrate;
at least one LED die fixed on the substrate;
a control unit fixed on the substrate, electrically connected to the LED die, and storing the unique identification code of the positioning landmark;
a wireless communication module fixed on the substrate, electrically connected to the control unit, and configured to wirelessly transmit the unique identification code of the wireless communication module;
a power supply fixed on the substrate, and configured to supply power to the LED die, the control unit and the wireless communication module; and
a housing.

26. An earth positioning system, comprising:
a plurality of fixed positioning landmarks with wireless communication functions, each of the positioning landmarks being configured to wirelessly transmit coordinates of longitude, latitude and altitude of the positioning landmark, wherein each said positioning landmark is an outdoor light, an indoor light or a fixed electric household appliance;
a moving slave node, configured to broadcast data including a wireless communication module identification code and a measured value of a sensor;
wherein the plurality of positioning landmarks are arranged in an indoor environment or an outdoor environment and are configured to scan the moving slave node when the moving slave node is nearby, so as to obtain the wireless communication module identification code, the measured value of the sensor and a received signal-strength indicator (RSSI) value or channel response of the moving slave node, and send the wireless communication module identification code, the measured value, the RSSI value or the channel response and the coordinates to a gateway and a cloud through WIFI, wherein the cloud is configured to integrate data transmitted from the positioning landmarks after the positioning landmarks scan the moving slave node, and calculate coordinates of longitude, latitude and altitude of the slave node by triangulation and positioning and tracking the moving slave node based on the calculated coordinates of longitude, latitude and altitude,
wherein the coordinates of longitude, latitude and altitude of positioning landmarks written into the positioning landmarks by the moving slave node are obtained previously from a Google map or an Apple map or an indoor map, and the wireless communication functions of the plurality of fixed positioning landmarks and a communication function of the moving slave node are respectively comprising communication functions of Bluetooth 4.0 and above.

27. An earth positioning system, comprising:
a plurality of fixed positioning landmarks with wireless communication functions, wherein each of the positioning landmarks is configured to alternately switch its role between a master node and a slave node, and is further configured to wirelessly transmit coordinates of longitude, latitude and altitude of the positioning landmark, wherein each said positioning landmark is an outdoor light, an indoor light or a fixed electric household appliance;
a moving slave node, configured to broadcast data including a wireless communication module identification code and a measured value of a sensor;
wherein the plurality of positioning landmarks are arranged in an indoor environment or an outdoor environment and are configured to scan the moving slave node when the moving slave node is nearby, so as to obtain the wireless communication module identification code, the measured value of the sensor and a received signal-strength indicator (RSSI) value or channel response of the moving slave node, and the positioning landmarks are configured to transmit a package composed of the wireless communication module identification code, the measured value of the sensor, the received signal-strength indicator (RSSI) value or channel response of the moving slave node and the coordinates of longitude, latitude and altitude of the positioning landmarks via a gateway to a cloud or receive the package via the gateway from the cloud through the master nodes utilizing a mechanism of multi-hop relay, wherein the cloud is configured to integrate data transmitted from the positioning landmarks after the positioning landmarks scan the moving slave node, and calculate the coordinates of longitude, latitude and altitude of the slave node by triangulation and positioning and tracking the moving slave node based on the calculated coordinates of longitude, latitude and altitude, wherein the mechanism of multi-hop relay comprising:
(a) each of the master node of fixed positioning landmarks scans the moving slave nodes nearby and determines whether the moving slave nodes has entered its range;
(b) after a first master node of the fixed positioning landmarks scans a first moving slave node entered the range, the first master node scans and identifies the slave nodes of the fixed positioning landmarks nearby to obtain the MAC address, the coordinates of longitude and latitude and the RSSI value of the slave nodes of the fixed positioning landmarks nearby;
(c) the first master node obtains and calculates the distances of the slave nodes of the fixed positioning landmarks to the gateway and obtains a first slave node having a distance closer than a distance of the first master node to the gateway;
(d) the first master node connects to the first slave node and writes data of the first moving slave node into the first slave node;
(e) after the first slave node receives the written data from the first master node, the first slave node convert into the first master node of the fixed positioning landmarks, and executing the steps (c)-(e) until a second slave node having the closest distance to the gateway receives the data of the first moving slave node;
(f) after the second slave node receives the written data from the first master node, the second slave node convert into a second master node of the fixed positioning landmarks, and the second master node transmit the data to the gateway.

28. An earth positioning system, comprising:
a plurality of fixed positioning landmarks with wireless communication functions, wherein each of the positioning landmarks is configured to alternately switch its role between a master node and a slave node, and is further configured to wirelessly transmit coordinates of longitude, latitude and altitude of the positioning landmark, wherein each said positioning landmark is an outdoor light, an indoor light or a fixed electric household appliance;
a moving slave node, configured to broadcast data including a wireless communication module identification code and a measured value of a sensor;
wherein the plurality of positioning landmarks are arranged in an indoor environment or an outdoor environment and are configured to scan the moving slave node when the moving slave node is nearby, so as to obtain the wireless communication module identification code, the measured value of the sensor and a received signal-strength indicator (RSSI) value or channel response of the moving slave node, and the positioning landmarks are configured to transmit a package composed of the wireless communication module identification code, the measured value of the sensor, the received signal-strength indicator (RSSI) value or channel response of the moving slave node and the coordinates of longitude, latitude and altitude of the positioning landmarks via a gateway to a cloud or receive the package via the gateway from the cloud through the master nodes utilizing a mechanism of multi-hop relay, wherein the cloud is configured to integrate data transmitted from the positioning landmarks after the positioning landmarks scan the moving slave node, and calculate the coordinates of longitude, latitude and altitude of the slave node by triangulation and positioning and tracking the moving slave node based on the calculated coordinates of longitude, latitude and altitude,
wherein the coordinates of longitude, latitude and altitude of positioning landmarks written into the positioning landmarks by the mobile communication device are obtained previously from a Google map or an Apple map or an indoor map,
wherein the mechanism of multi-hop relay comprising:
(a) each of the master node of fixed positioning landmarks scans the moving slave nodes nearby and determines whether the moving slave nodes has entered its range;
(b) after a first master node of the fixed positioning landmarks scans a first moving slave node entered the range, the first master node scans and identifies the slave nodes of the fixed positioning landmarks nearby to obtain the MAC address, the coordinates of longitude and latitude and the RSSI value of the slave nodes of the fixed positioning landmarks nearby;
(c) the first master node obtains and calculates the distances of the slave nodes of the fixed positioning landmarks to the gateway and obtains a first slave node having a distance closer than a distance of the first master node to the gateway;
(d) the first master node connects to the first slave node and writes data of the first moving slave node into the first slave node;
(e) after the first slave node receives the written data from the first master node, the first slave node convert into the first master node of the fixed positioning landmarks, and executing the steps (c)-(e) until a second slave node having the closest distance to the gateway receives the data of the first moving slave node;
(f) after the second slave node receives the written data from the first master node, the second slave node convert into a second master node of the fixed positioning landmarks, and the second master node transmit the data to the gateway.

* * * * *